United States Patent [19]
Addor et al.

[11] 3,718,718
[45] Feb. 27, 1973

[54] ARALKYLTHIOVINYL PHOSPHOROTHIOATES

[75] Inventors: Roger Williams Addor, Pennington; Thomas Walter Drabb, Jr., Trenton, both of N.J.

[73] Assignee: American Cyanamid Company, Stamford, Conn.

[22] Filed: Dec. 7, 1970

[21] Appl. No.: 95,908

Related U.S. Application Data

[63] Continuation-in-part of Ser. No. 807,921, March 17, 1969, abandoned.

[52] U.S. Cl. ................ 260/948, 260/972, 424/216
[51] Int. Cl. ........................ C07f 9/16, A01n 9/36
[58] Field of Search ........................ 260/948, 972

[56] References Cited

UNITED STATES PATENTS 3,174,990   3/1965   Ward et al. .................... 260/972 X

*Primary Examiner*—Lewis Gotts
*Assistant Examiner*—Anton H. Sutto
*Attorney*—Robert P. Raymond

[57] ABSTRACT

The acaricidal and insecticidal compounds have the formula:

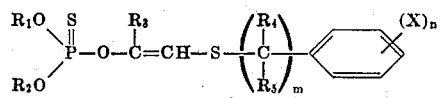

wherein:
$R_1$, $R_2$ and $R_3$ are each lower alkyl,
$R_4$ and $R_5$ are lower alkyl or hydrogen,
X is lower alkyl or halo,
$m$ is 1 or 2, and
$n$ is 0 to 3

The trans and cis isomeric forms of the above compounds as well as mixtures of the trans and cis forms are embraced with the scope of the above formula.

The compounds are prepared by reacting an α-aralkyl-thioketone with an 0,0-di(lower)alkyl phosphorohalothioate in the presence of a polar solvent and certain strong bases such as NaOH or KOH.

7 Claims, No Drawings

ARALKYLTHIOVINYL PHOSPHOROTHIOATES

This is a continuation-in-part application of our copending application for Letters Patent, Ser. No. 807,921, filed Mar. 17, 1969 now abandoned.

SUMMARY OF THE INVENTION

This invention relates to aralkylthiovinyl phosphorothioates represented by the formula:

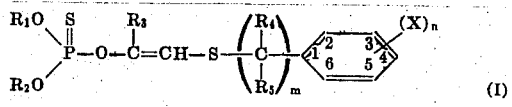

(I)

wherein:
 $R_1$, $R_2$ and $R_3$ are each lower alkyl,
 $R_4$ and $R_5$ are selected from the group consisting of lower alkyl or hydrogen,
 X is selected from the group consisting of lower alkyl and halo,
 m is 1 or 2, and
 n is 0 to 3

The compounds represented by formula (I) may exist in either a trans or a cis isomeric form as shown by the formulas presented below:

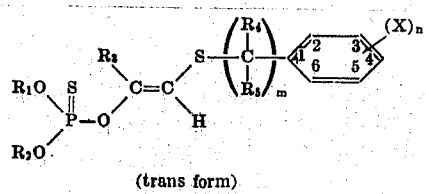

(trans form)

and

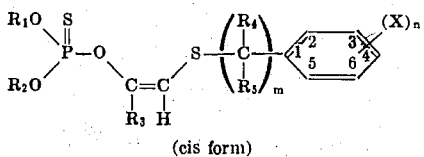

(cis form)

It is to be understood that chemical formula (I) as used herein embraces either the trans or the cis form as well as mixtures of the trans and cis forms.

This invention also relates to the use of the above compounds as insecticides and acaricides.

This invention further relates to a process for preparing the above compounds.

The term "lower alkyl" means straight and branched chain saturated hydrocarbons containing from one to five carbon atoms. Illustrative members are methyl, ethyl, n-propyl, i-propyl, n-butyl, sec-butyl, t-butyl, n-pentyl, 2-pentyl, and 3-pentyl.

The term halo means chloro, bromo, iodo, and fluoro.

When m is 2, the $R_4$ and $R_5$ groups can be attached to either the carbon atom closest to the sulfur or that closest to the phenyl or both. The $R_4$ and $R_5$ groups may be similar or dissimilar.

DESCRIPTION OF THE PREFERRED EMBODIMENTS

The following compounds are illustrative of the compound of this invention:

| | | | | | | | X | | | | |
|---|---|---|---|---|---|---|---|---|---|---|---|
| $R_1$ | $R_2$ | $R_3$ | $R_4$ | $R_5$ | m | n | $2^4$ | $3^4$ | $4^4$ | $5^4$ | $6^4$ |
| $CH_3$ | $CH_3$ | $CH_3$ | H | H | 1 | 1 | Cl | | | | |
| $CH_3$ | $CH_3$ | $CH_3$ | H | H | 1 | 1 | | Br | | | |
| $CH_3$ | $CH_3$ | $CH_3$ | H | H | 1 | 1 | | | F | | |
| $CH_3$ | $CH_3$ | $CH_3$ | H | H | 1 | 1 | I | | | | |
| $CH_3$ | $CH_3$ | $CH_3$ | H | H | 1 | 1 | | | | | Cl |
| $CH_3$ | $CH_3$ | $CH_3$ | H | H | 1 | 2 | Cl | Cl | | | |
| $CH_3$ | $CH_3$ | $CH_3$ | H | H | 1 | 2 | Cl | | | | Cl |
| $CH_3$ | $CH_3$ | $CH_3$ | H | H | 1 | 2 | | Br | Br | | |
| $CH_3$ | $CH_3$ | $CH_3$ | H | H | 1 | 2 | Cl | Br | | | |
| $CH_3$ | $CH_3$ | $CH_3$ | H | H | 1 | 2 | Cl | | F | | |
| $CH_3$ | $CH_3$ | $CH_3$ | H | H | 1 | 2 | I | | | Br | |
| $CH_3$ | $CH_3$ | $CH_3$ | H | H | 1 | 3 | Cl | Cl | | | Cl |
| $CH_3$ | $CH_3$ | $CH_3$ | H | H | 1 | 3 | F | | Br | Cl | |
| $CH_3$ | $CH_3$ | $CH_3$ | H | H | 1 | 3 | Br | | Br | Br | |
| $CH_3$ | $CH_3$ | $CH_3$ | H | H | 1 | 3 | | Cl | Cl | Cl | |
| $CH_3$ | $CH_3$ | $CH_3$ | H | H | 1 | 3 | Cl | I | | Cl | |
| $C_2H_5$ | $C_2H_5$ | $CH_3$ | H | H | 1 | 1 | Cl | | | | |
| $C_2H_5$ | $C_2H_5$ | $CH_3$ | H | H | 1 | 1 | | | Br | | |
| $C_2H_5$ | $C_2H_5$ | $CH_3$ | H | H | 1 | 1 | F | | | | |
| $C_2H_5$ | $C_2H_5$ | $CH_3$ | H | H | 1 | 1 | I | | | | |
| $C_2H_5$ | $C_2H_5$ | $CH_3$ | H | H | 1 | 2 | Cl | Cl | | | |
| $C_2H_5$ | $C_2H_5$ | $CH_3$ | H | H | 1 | 2 | Br | Br | | | |
| $C_2H_5$ | $C_2H_5$ | $CH_3$ | H | H | 1 | 2 | | Cl | Br | | |
| $C_2H_5$ | $C_2H_5$ | $CH_3$ | H | H | 1 | 3 | Cl | Cl | Cl | | |
| $C_2H_5$ | $C_2H_5$ | $CH_3$ | H | H | 1 | 3 | Br | Br | Br | | |
| $C_2H_5$ | $C_2H_5$ | $CH_3$ | H | H | 1 | 3 | Br | Cl | Cl | | |
| n-$C_3H_7$ | n-$C_3H_7$ | $CH_3$ | H | H | 1 | 1 | | | Cl | | |
| n-$C_3H_7$ | n-$C_3H_7$ | $CH_3$ | H | H | 1 | 2 | Br | Br | | | |
| n-$C_3H_7$ | n-$C_3H_7$ | $CH_3$ | H | H | 1 | 3 | Cl | Cl | | | Cl |
| n-$C_3H_7$ | n-$C_3H_7$ | $CH_3$ | H | H | 1 | 1 | | Cl | | | |
| $CH_3$ | $CH_3$ | $C_2H_5$ | H | H | 1 | 1 | | Cl | | | |
| $CH_3$ | $CH_3$ | $C_2H_5$ | H | H | 1 | 2 | Br | Br | | | |
| $CH_3$ | $CH_3$ | $C_2H_5$ | H | H | 1 | 3 | Cl | Cl | | | Cl |
| $CH_3$ | $CH_3$ | n-$C_4H_9$ | H | H | 1 | 1 | | Cl | | | |
| $CH_3$ | $CH_3$ | $CH_3$ | H | H | 2 | 1 | Cl | | | | |
| $CH_3$ | $CH_3$ | $CH_3$ | H | H | 2 | 1 | | | Cl | | |
| $CH_3$ | $CH_3$ | $CH_3$ | H | H | 2 | 1 | Cl | | | | |
| $CH_3$ | $CH_3$ | $CH_3$ | H | H | 2 | 2 | Br | Cl | | | |
| $CH_3$ | $CH_3$ | $CH_3$ | H | H | 2 | 2 | Cl | | Br | Cl | |
| $C_3H_7$ | $C_3H_7$ | $C_2H_5$ | H | H | 2 | 1 | F | | Cl | | |
| $C_3H_7$ | $C_3H_7$ | $C_2H_5$ | H | H | 2 | 2 | | Cl | Br | | |
| $C_3H_7$ | $C_3H_7$ | $C_2H_5$ | H | H | 2 | 3 | I | Cl | Cl | Cl | F |
| $CH_3$ | $CH_3$ | $CH_3$ | $CH_3$ | $CH_3$ | 1 | 1 | Cl | | | | |
| $CH_3$ | $CH_3$ | $CH_3$ | $CH_3^1$ | H | 2 | 1 | | CH$_3$ | | | |
| $CH_3$ | $CH_3$ | $CH_3$ | $C_2H_5$ | H | 1 | 1 | | | Cl | | |
| $CH_3$ | $CH_3$ | $CH_3$ | $C_2H_5^2$ | $C_2H_5^2$ | 2 | 2 | | Cl | Cl | | |
| $CH_3$ | $CH_3$ | $CH_3$ | $CH_3^3$ | H | 2 | 2 | Br | Br | | | |
| $CH_3$ | $CH_3$ | $CH_3$ | n-$C_3H_7$ | H | 2 | 3 | | CH$_3$ | Cl | Cl | |
| $CH_3$ | $CH_3$ | $CH_3$ | $CH_3^3$ $C_2H_5^1$ | $CH_3^3$ $C_2H_5^1$ | 1 | 0 | | | | | |

Table - Continued

| R₁ | R₂ | R₃ | R₄ | R₅ | m | n | 2⁴ | 3⁴ | 4⁴ | 5⁴ | 6⁴ |
|---|---|---|---|---|---|---|---|---|---|---|---|
| CH₃ | CH₃ | CH₃ | CH₃¹ n-C₃H₇¹ | C₂H₅³ H | 2 | 0 | | | | | |
| CH₃ | CH₃ | CH₃ | H | H | 1 | 1 | CH₃ | | | | |
| CH₃ | CH₃ | CH₃ | H | H | 1 | 1 | | | C₂H₅ | | |
| CH₃ | CH₃ | CH₃ | H | H | 1 | 1 | | C₃H₇ | | | |
| CH₃ | CH₃ | CH₃ | H | H | 1 | 1 | CH₃ | | | | |
| C₂H₅ | C₂H₅ | CH₃ | H | H | 1 | 2 | CH₃ | CH₃ | | | |
| CH₃ | CH₃ | CH₃ | H | H | 1 | 2 | | C₂H₅ | CH₃ | | |
| CH₃ | CH₃ | CH₃ | H | H | 1 | 2 | CH₃ | CH₃ | | | |
| CH₃ | CH₃ | CH₃ | H | H | 1 | 2 | CH₃ | | Cl | | |
| CH₃ | CH₃ | CH₃ | H | H | 1 | 3 | CH₃ | CH₃ | CH₃ | | |
| CH₃ | CH₃ | CH₃ | H | H | 1 | 3 | Br | | CH₃ | | Br |
| CH₃ | CH₃ | CH₃ | H | H | 1 | 3 | C₂H₅ | | CH₃ | CH₃ | |
| C₂H₅ | C₂H₅ | i-C₃H₇ | H | H | 1 | 0 | | | | | |
| C₂H₅ | C₂H₅ | C₂H₅ | H | H | 2 | 0 | | | | | |

¹ Attached to carbon nearest sulfur atom.
² Attached to each carbon.
³ Attached to carbon nearest phenyl group.
⁴ Denotes position on the phenyl ring.

PROCESS

The compounds of this invention are conveniently prepared by a novel process which comprises reacting an α-aralkylthioketone of the formula:

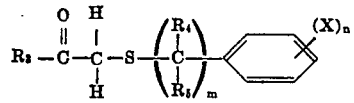

with an O,O-di(lower)alkyl phosphorohalothioate of the formula:

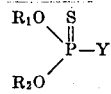

wherein $R_1$, $R_2$, $R_3$, $R_4$, $R_5$, X, m and n are as defined above and wherein Y is halo, in the presence of (1a polar aprotic solvent having a dielectric constant greater than about 22 and (2) a strong base selected from the group consisting of alkali metal hydroxides, alkali metal alkoxides, alkali metal hydrides, and tetra(lower)alkylammonium hydroxides.

In general, the trans form of the inventive compounds appears to have greater insecticidal and acaricidal activity than the cis form. It therefore becomes desirable to prepare a product mixture containing as much of the trans form as possible. It has been found that when the reaction is carried out in more polar solvents as described above, a reaction mixture enriched in the trans form of the compound is produced.

Illustrative solvents are dimethylformamide, dimethylsulfoxide, dimethylacetamide, acetonitrile, and the tetrahydrosulfolanes such as tetrahydrothiophene dioxide. Dimethylformamide is a preferred solvent.

Suitable bases are potassium tertiary butoxide, sodium methoxide, sodium propoxide, sodium hydroxide, potassium hydroxide, sodium hydride, and tetramethylammonium hydroxide. Potassium hydroxide and sodium hydroxide are preferred bases. A preferred amount of base is about 0.9 to about 1.1 moles per mole of reactant.

A preferred solvent base system is dimethylformamide and either sodium hydroxide or potassium hydroxide due to the high yields and cleaner reaction products resulting therefrom.

The reaction proceeds at temperatures between 0°C. and 100°C. However, a temperature range of 10° to 40°C. is preferred. The reaction can be run at subatmospheric, atmospheric, or superatmospheric pressure, with atmospheric pressure preferred.

All of the required reactants are either readily available on a commercial basis or can be readily prepared by techniques well known to those skilled in the art. Preferably Y will be chloro in the phosphorohalothioate reactant due to the commercial availability of these particular compounds.

The process of this invention ordinarily produces a mixture of the trans and cis forms of the inventive compounds as discussed above. Substantially pure, i.e., 90 percent or more, trans or cis compounds can be obtained, however, using well known isomer separation techniques such as, for example, chromatography on selective solid substrates such as magnesium silicate.

UTILITY

The compounds of this invention are useful for controlling a variety of insects and acarina such as those shown in the examples provided hereinbelow.

They are highly effective when applied to domestic animals such as cattle, pigs, and sheep which are infested with insects and acarina, and particularly when applied to animals infested with athropods such as ticks by the use of dipping vats, sprays, spray-races, dusts, and other methods known to those skilled in the art.

They can be applied to the foliage of plants as dusts or liquid sprays to protect them from pests which feed thereon; they may also be incorporated in or applied to the soil in order to protect germinating and growing plants from soil-borne pests which attack the root systems and stems of said plants; or they may be applied to the breeding sites of pests to control both the larvae and adult stages of breeding pest populations. In the latter situations the compounds may be applied in conventional formulations such as dusts, dust concentrates, granular materials, wettable powders, emulsifiable concentrates and the like. They may be employed as an emulsion in water or other non-solvents to which suitable surfactants, wetting agents or emulsifying agents have been added. They may be applied on solid carriers, such as talcs and clays, as for example kaolin clay or fuller's earth, or on such carriers as chalk, wood flour, silica, charcoal, activated carbon or other inert powders. As a wettable powder, the compounds of this invention may be applied to easily wettable carrier materials, such as attaclay, with or without the aid of surfactants, or on less readily wettable carriers in combination with suitable surfactants.

Advantageously, the compounds of the invention may also be applied by the most modern techniques of low volume or ultra-low volume application wherein the compound is applied essentially as a technical material or in combination with a minor amount of hydrocarbon solvent such as Panasol AN-5, Socal 44-L or Esso HAN (all commercially available).

The compounds of this invention may also be applied in combination with other essentially technical materials, such as malathion, which in addition to having insecticidal properties also serve as a formulation vehicle.

The following examples are provided to further illustrate the unusual properties exhibited by the compounds of this invention.

EXAMPLE 1

Preparation of O,O-Diethyl O-1-Methyl-2-(benzylthio)vinyl Phosphorothioate

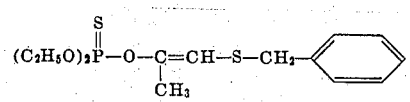

To 8.0 g. of benzylthio-2-propanone and 8.4 g. of O,O-diethyl phosphorochloridothioate in 80 ml. of dimethylformamide was added 3.5 g. powdered potassium hydroxide. After the initial exotherm to 40°C., the mixture was warmed at 45°C. for 45 minutes, cooled, and then poured into water. The mixture was extracted twice with an ether-benzene mixture. The organic phase was washed twice with water, dried with magnesium sulfate, and concentrated in vacuo to give 13.8 g. of crude product as a brown oil. This material, by gas-liquid chromatography, was 81 percent pure. The ratio of trans to cis isomers was found to be 57:43 by comparison of the integrals of signals in the nuclear magnetic resonance spectrum at 4.3 (trans) and 4.8 (cis). Chromatography on Florisil using petroleum ether-methylene chloride (cis)reluting gave 5.2 g. of pure product containing 94 percent of the trans and 6 percent of the cis isomer and 3.4 g. of pure product containing 94 percent of the cis and 6 percent of the trans isomer as determined by the nuclear magnetic resonance spectra.

Anal:
Calc'd. for $C_{14}H_{21}O_3PS_2$: C, 50.6; H, 6.3; P, 9.3; S, 19.3.
  Found: Trans: C, 51.0; H, 6.4; P, 8.9; S, 19.0.
  Cis: C, 51.0; H, 6.3; P, 9.3; S, 19.7.

EXAMPLE 2

Preparation of O,O-Diethyl O-1-Methyl-2-(benzylthio)vinyl Phosphorothioate

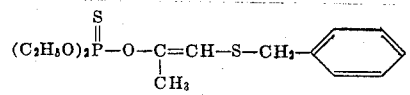

To a cooled and stirred mixture of 15.0 g. of benzylthio-2-propanone in 180 ml. of dimethylsulfoxide was added 9.3 g. of potassium t-butoxide. With continued stirring and cooling of the reaction flask, 15.7 g. of O,O-diethylphosphorochloridothioate was added. After several additional minutes, the mixture was diluted with cold water and extracted with methylene chloride. Concentration of the methylene chloride mixture under vacuum left 24.1 g. of product as a dark oil.

Fifteen grams of the crude reaction product was chromatographed on 300 g. of Florisil using petroleum ether-methylene chloride mixture to elute off first 5.1 g. of 95 percent pure trans material followed by 4.7 g. of an 85 percent cis-15 percent trans mixture.

Anal:
Calc'd. for $C_{14}H_{24}O_3PS_2$: C, 50.61; H, 6.32; P, 9.33; S, 19.30.
  Found (95% trans): C, 51.01; H, 6.31; P, 9.30; S, 19.67.
  Found (85% cis): C, 51.00; H, 6.42; P, 8.90; S, 19.04.

EXAMPLES 3 to 26

A variety of inventive compounds were prepared following substantially the same procedure as given in Examples 1 or 2 except the substituents on the two reactants were varied. A summary of the compounds prepared and pertinent physical properties of these compounds is presented below in Table I.

TABLE I

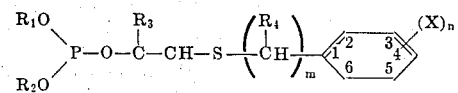

| Ex. No. | $R_1$ | $R_2$ | $R_3$ | $R_4$ | m | n | X (2) | X (3) | X (4) | X (5) | X (6) | Crude yield (percent)[1] | Isomeric form | | C | H | P |
|---|---|---|---|---|---|---|---|---|---|---|---|---|---|---|---|---|---|
| 3 | $CH_3$ | $CH_3$ | $CH_3$ | H | 1 | 0 | | | | | | 68 | 100% trans | c[3]<br>f[4] | 47.4<br>47.5 | 5.6<br>5.7 | 10.2<br>10.2 |
| 4 | $CH_3$ | $CH_3$ | $CH_3$ | H | 1 | 0 | | | | | | | 100% cis | c<br>f | 47.4<br>47.6 | 5.6<br>5.7 | 10.2<br>9.8 |
| 5 | $C_2H_5$ | $C_2H_5$ | $CH_3$ | $CH_3$ | 1 | 0 | | | | | | 96 | 100% trans | c<br>f | 52.0<br>52.8 | 6.7<br>6.8 | 8.9<br>9.5 |
| 6 | $C_2H_5$ | $C_2H_5$ | $CH_3$ | $CH_3$ | 1 | 0 | | | | | | | 100% cis | c<br>f | 52.0<br>52.8 | 6.7<br>6.8 | 8.9<br>9.5 |
| 7 | $C_2H_5$ | $C_2H_5$ | $CH_3$ | H | 1 | 1 | | | $CH_3$ | | | 82 | 100% trans | c<br>f | 52.0<br>51.6 | 6.7<br>6.7 | 8.9<br>8.8 |
| 8 | $C_2H_5$ | $C_2H_5$ | $CH_3$ | H | 1 | 1 | | | $CH_3$ | | | | 100% cis | c<br>f | 52.0<br>51.4 | 6.7<br>6.5 | 8.9<br>8.8 |
| 9 | $C_2H_5$ | $C_2H_5$ | $CH_3$ | H | 1 | 1 | | | | | $CH_3$<br>$CH_3$ | 90 | 100% trans | c<br>f | 52.0<br>52.2 | 6.7<br>6.7 | 8.9<br>8.9 |
| 10 | $C_2H_5$ | $C_2H_5$ | $CH_3$ | H | 1 | 1 | | | | | | | 100% cis | c<br>f | 52.0<br>52.3 | 6.7<br>6.8 | 8.9<br>9.1 |
| 11 | $C_2H_5$ | $C_2H_5$ | $CH_3$ | H | 1 | 1 | | | Cl | | | | 100% trans | c<br>f | 45.8<br>47.0 | 5.5<br>5.5 | 8.4<br>8.2 |
| 12 | $C_2H_5$ | $C_2H_5$ | $CH_3$ | H | 1 | 1 | | | Cl | | | | 100% cis | c<br>f | 45.8<br>47.4 | 5.5<br>5.5 | 8.4<br>8.0 |
| 13 | $C_2H_5$ | $C_2H_5$ | $CH_3$ | H | 1 | 1 | | Cl | | | | 90 | 100% trans | c<br>f | 45.8<br>44.6 | 5.5<br>5.6 | 8.4<br>8.7 |
| 14 | $C_2H_5$ | $C_2H_5$ | $CH_3$ | H | 1 | 1 | | Cl | | | | | 100% cis | c<br>f | 45.8<br>47.1 | 5.5<br>5.5 | 8.4<br>8.6 |

Table I - Continued $$R_1O\diagdown_{R_2O}\!\!P\!-\!O\!-\!\overset{R_3}{\underset{}{C}}\!=\!CH\!-\!S\!-\!\left(\overset{R_4}{\underset{}{C}H}\right)_{\!m}\!\!-\!\!\underset{6\ 5}{\overset{2\ 3}{\diagup\!\!\diagdown}}\!(X)_n$$

| Ex. No. | $R_1$ | $R_2$ | $R_3$ | $R_4$ | m | n | X 2⁵ | 3⁵ | 4⁵ | 5⁵ | 6⁵ | Crude yield (percent)¹ | Isomeric form | | Product analysis C | H | P |
|---|---|---|---|---|---|---|---|---|---|---|---|---|---|---|---|---|---|
| 15 | CH₃ | CH₃ | CH₃ | H | 1 | 1 | Cl | | | | | | 100% trans | c / f | 42.5 / 44.3 | 4.8 / 4.9 | 9.1 / 9.3 |
| 16 | CH₃ | CH₃ | CH₃ | H | 1 | 1 | Cl | | | | | | 100% cis | c / f | 42.5 / 43.6 | 4.8 / 4.7 | 9.1 / 8.8 |
| 17 | C₂H₅ | C₂H₅ | CH₃ | H | 1 | 2 | Cl | | Cl | | | 87 | 100% trans | c / f | 41.9 / 42.1 | 4.7 / 4.8 | 7.7 / 8.3 |
| 18 | C₂H₅ | C₂H₅ | CH₃ | H | 1 | 2 | Cl | | Cl | | | | 100% cis | c / f | 41.9 / 42.2 | 4.7 / 4.8 | 7.7 / 7.6 |
| 19 | CH₃ | CH₃ | CH₃ | H | 1 | 2 | Cl | | Cl | | | | 100% trans | c / f | 38.6 / 38.9 | 4.0 / 4.2 | 8.3 / 8.2 |
| 20 | CH₃ | CH₃ | CH₃ | H | 1 | 2 | Cl | | Cl | | | | 100% cis | c / f | 38.6 / 38.9 | 4.0 / 4.0 | 8.3 / 8.1 |
| 21 | CH₃ | CH₃ | CH₃ | H | 2 | 0 | | | | | | 100 | 100% trans | c / f | 49.0 / 49.2 | 6.0 / 5.8 | 9.7 / 9.7 |
| 22 | C₂H₅ | C₂H₅ | CH₃ | H | 1 | 2 | | Cl | Cl | | | 80 | 50% trans, 50% cis | c / f | 41.9 / 42.2 | 4.7 / 4.7 | 7.7 / 8.1 |
| 23 | C₂H₅ | C₂H₅ | CH₃ | H | 1 | 2 | Cl | | | | Cl | 91 | 70% trans, 30% cis | c / f | 41.9 / 42.8 | 4.7 / 5.0 | |
| 24 | CH₃ | CH₃ | CH₃ | H | 1 | 2 | Cl | | | | Cl | 79 | 77% trans, 23% cis | c / f | 38.6 / 39.3 | 4.0 / 4.0 | |
| 25 | C₂H₅ | CH₃ | CH₃ | H | 1 | 3 | Cl | | Cl | Cl | | 93 | 67% trans, 33% cis | c / f | 38.6 / 39.0 | 4.0 / 4.5 | 7.1 / 7.1 |
| 26 | C₂H₅ | CH₃ | CH₃ | H | 1 | 3 | Cl | | Cl | Cl | | | cis | c / f | 38.6 / 38.4 | 4.2 / 3.9 | 7.1 / 7.0 |

¹ Before isomer separation.
² After isomer separation.
³ Calculated.
⁴ Found.
⁵ Indicates ring position on the phenyl ring (positions 2 and 6 are equivalent as are 3 and 5 provided there is no ring substitution).

EXAMPLE 27

Preparation of O,O-Diethyl 0-1-methyl-2-(2-Phenylpropylthio)-vinyl Phosphorothioate

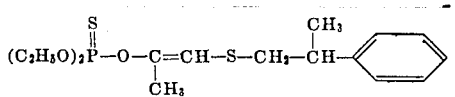

A mixture of 20.8 g. of 2-phenylpropylthio-2-propanone and 18.9 g. of O,O-diethylphosphorochloridothioate was stirred in 200 ml. of dimethylformamide. To this mixture was added 7.1 g. of ground potassium hydroxide with the reaction temperature kept below about 40°C. by cooling with an ice bath. After another 30 minutes at room temperature, the mixture was diluted with water and the mixture was extracted with benzene. The benzene mixture was water-washed, dried and concentrated in vacuo affording a good yield of the phosphorothioate ester also showing the typical carbon-carbon double bond absorption at 1650 cm⁻¹.

EXAMPLE 28

Preparation of O,O-Diethyl 0-1-Methyl-2-(2,4-Dibromobenzylthio)-vinyl Phosphorothioate

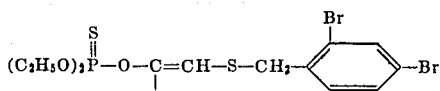

The procedure of Example 27 was followed except that 33.8 g. of 2,4-dibromobenzylthio-2-propane replaced the 2-phenylpropyl-2-propanone. The product as obtained showed NMR signals at about 4.0 τ and 4.5 τ for the trans and cis isomers respectively, with the trans isomer in the greater amount.

EXAMPLE 29

Preparation of O,O-Dimethyl 0-1-Methyl-2-(3,5-Dimethylbenzylthio)vinyl Phosphorothioate

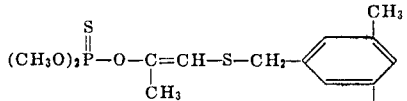

A mixture of 20.8 g. of 3,5-dimethylbenzylthio-2-propane and 11.2 g. of potassium t-butoxide was stirred in 250 ml. of dimethylsulfoxide. The mixture was cooled with an ice bath and 16.1 g. of O,O-dimethylphosphorochloridothioate was added. After another 30 minutes, the mixture was poured into water and extracted as in the other preparations. The oily product showed medium-strong carbon-carbon double bond absorption at 1650 cm⁻¹ and only trace amounts of carbonyl absorption due to the starting ketone.

EXAMPLE 30

Preparation of O,O-Dimethyl 0-1-Methyl-2-(2-methyl-4-chlorobenzylthio)vinyl Phosphorothioate

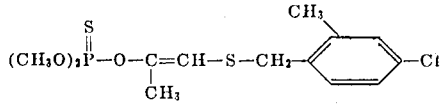

The procedure of Example 29 was followed except that 22.9 g. of 2-methyl-4-chlorobenzylthio-2-propanone replaced the 3,5-dimethylbenzylthio-2-propanone. The oily product showed the typical 1650 cm⁻¹ infrared absorption.

EXAMPLE 31

Preparation of O,O-Dimethyl 0-1-Ethyl-2-(2-chlorobenzylthio)-vinyl Phosphorothioate

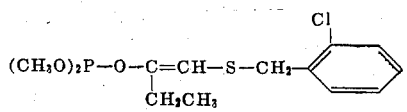

The procedure of Example 29 was followed substituting 22.9 g. of 1-(2-chlorobenzylthio)-2-butanone for 3,5-dimethylbenzylthio-2-propanone. A good yield of the trans - cis mixture with carbon-carbon double bond absorption at 1650 cm$^{-1}$ was obtained.

EXAMPLE 32

Mammalian Toxicity and Insecticidal and Acaricidal Activity of the Inventive Compounds The compounds were tested against a variety of insects and acarina in accordance with the following test procedures. Results are tabulated below in Table II along with mamalian (mice) LD$_{50}$ data obtained using standardized procedures.

A. Bean aphid — *Aphis fabae* Scopoli

Compounds are tested as 0.1% solutions or suspensions in 65 percent acetone-35 percent water. Two-inch fiber pots, each containing a nasturtium plant two inches high and infested with about 150 aphids 2 days earlier, are placed on a turntable (4 rpm) and sprayed for two revolutions with a No. 154 DeVilbiss Atomizer at 20 psi air pressure. The spray tip is held about six inches from the plants and the spray is directed so as to give complete coverage of the aphids and the plants. The sprayed plants are laid on their sides on white enamel trays which have had the edges coated with No. 50 SAE oil as a barrier. Mortality estimates are made after holding for 2 days at 70°F., and 50% r.h. Compounds are further tested at ten-fold dilutions in 65 percent acetone-35 percent water.

B. Southern armyworm — *Prodenia eridania* (Cramer)

The solutions from the aphid test are also used for this one. Sieva lima bean primary leaves are dipped for three seconds in the test solution and set in a hood on a screen to dry. When dry, each leaf is placed in a 4-inch petri dish which has a moist filter paper in the bottom and ten third-instar armyworm larvae about three-eighths inch long. The dishes are covered and held at 80°F., and 60% r.h. After 2 days, mortality counts and estimates of the amount of feeding are made. Compounds showing partial kill and/or inhibition of feeding are held an extra day for further observations. Compounds are further tested at ten-fold dilutions in 65 percent acetone-35 percent water.

C. Two spotted spider mite — *Tetranychus urticae* (Koch)

Sieva lima bean plants with primary leaves three to four inches long are infested with about 100 adult mites per leaf four hours before use in this test. The mite and egg infested plants are dipped for three seconds in the same solutions used in the above tests, and the plants set in the hood to dry. They are held for two days at 80°F., 60 percent r.h., and the adult mite mortality estimated on one leaf under a stereoscopic microscope. The other leaf is left on the plant an additional five days and then examined at 10X power to estimate the kill of eggs and of newly-hatched nymphs, giving a measure of ovicidal and residual action, respectively. Compounds are further tested at 10-fold dilutions in 65 percent acetone-35 percent water.

D. Confused flour beetle — *Tribolium confusum* Jacquelin duVal Compounds are formulated as 1% dusts by mixing 0.1 gram of the compound with 9.9 grams of Pyrax ABB talc, wetting with 5 ml. of acetone and grinding with a mortar and pestle until dry. 125 mg. of this 1 percent dust is then blown into the top of a dust settling tower with a short blast of air at 20 psi. The dust is allowed to settle on 4-inch petri dishes for 2 minutes, giving a deposit of approximately 87 mg./sq. foot (.094 mg./sq. cm.) of the 1 percent dust. The dishes are removed and 25 adult confused flour beetles are added immediately. The dishes are held for three days at 80°F. and 60% r.h., following which mortality counts are made.

E. Large milkweed bug — *Oncopeltus fasciatus* Dallas

The 1 percent dusts described above are used in this test. 25 mg. of the 1 percent dust is sprinkled evenly over the glass bottom of a seven-inch diameter cage, using a screen-bottom plastic cup about five-eighths inch in diameter as an applicator, giving a deposit of approximately 94 mg./sq. ft. (.108 mg./sq. cm.) of the 1 percent dust. Water is supplied in a 2-ounce bottle with a cotton wick, 20 adult bugs are added and a screen cover placed on the top. Mortality counts are made after holding for three days at 80°F. and 60% r.h.

F. German cockroach — *Blattella germanica* (Linnaeus)

The procedure is the same as for the large milkweed bug test, except that in this test only adult males are used.

G. Systemic Tests

The compound to be tested is formulated as an emulsion containing 0.1 gram of test material, 0.2 gram of Alrodyne 315 emulsifier, 10 ml. of acetone and 90 ml. of water. This is diluted 10-fold with water to give a 100 ppm emulsion for the initial test. A sieva lima bean plant with only the primary leaves unfolded is cut off just above soil level and inserted into a 2 ounce bottle of 100 ppm emulsion and held in place by a bit of cotton wrapped around the stem. The bottle is then placed in a ventilated box with the leaves extending outside the box, such that any possible fumes from the compound will be drawn out the end of the box rather than rising to affect the test leaves. About 50 adult two-spotted spider mites are placed on each leaf. After holding 3 days at 80°F. and 60% r.h., mortality estimates are made.

H. Common malaria mosquito — *Anopheles quadrimaculatus* Say

1. Larvicide test.

Groups of 25 larvae of the common malaria mosquito are transferred with a medicine dropper to a 50 ml. beaker containing 25 ml. of water. The test compound is formulated as an emulsion containing 0.1 gram of test material, 0.2 gram of Alrodyne 315 emulsifier, 10 ml. of acetone and 90 ml. of water. This 1000 ppm emulsion is diluted 10-fold with 65 percent acetone-35 percent water to give 100 ppm. One milliliter of the 100 ppm emulsion is pipetted into 225 ml. of water in a 400 ml. beaker and stirred vigorously. The larvae in 25 ml. of water are added, giving a concentration of 0.4 ppm. Mortality counts are made after 24 hours at 80°F. Compounds are further tested at 0.1 and 0.01 ppm.

2. Adulticide test.

Test compounds are prepared as 10 ppm solutions in acetone. Glass microscope slides are dipped in the test solutions and allowed to dry in a horizontal position. When dry, they are individually placed in 4-ounce wide mouth bottles and ten 4 to 5 day old mosquitoes of mixed sexes are added to each bottle. A piece of cotton gauze serves as a lid, and a wad of cotton soaked in 10 percent sugar solution serves as food. Mortality counts are made after 24 hours of continuous exposure to the residue on the glass slide; temperature is 80°F. and r.h. is 60%.

I. Housefly — *Musca domestica* Linnaeus

Groups of 25 adult female houseflies are lightly anesthetized with $CO_2$, placed in wide-mouth pint mason jars, and covered with a screen cap. The test compound is formulated as an emulsion containing 0.1 gram of test material, 0.2 gram of Alrodyne 315 emulsifier, 10 ml. of acetone and 90 ml. of water. Two milliliters of this emulsion are diluted to 40 ml. with 10 percent sugar solution in a 10-gram glass vial, giving a concentration of 50 ppm. The mouth of the vial is covered with a single layer of cheesecloth, inverted and placed on the screen cap, so that the flies can feed on the solution through the screen. Mortality counts are made after 2 days at 80°F.

J. Southern corn rootworm — *Diabrotica undecimpunctata howardi* Barber

The compound is formulated as a dust and incorporated into the soil at the equivalent of 50 pounds per 6-inch acre. The soil is sub-sampled into one-ounce wide mouth bottles, and ten 6- to 8-day old rootworm larvae added to each bottle, which is then capped. Mortality counts are made after 6 days at 80°F., 60% r.h. Compounds are further tested at 10 and 1 pounds/acre.

K. False wireworm — *Eleodes suturalis* (Say)

The test is the same as with the rootworms except that 10-day old wireworm larvae are used.

L. Tarnished Plant Bug — *Lygus lineolaris* (Palisot de Beauvois)

Test compounds are prepared as 1000 ppm solutions in 10 percent acetone, 0.2 percent Alrodyne 315, and 89.8 percent water. A 10-fold dilution is made with 65 percent acetone and 35 water. The primary leaves of Sieva lima bean plants are dipped for 3–5 seconds in the test solutions and placed in an exhaust hood to dry. When dry, each leaf is placed in a 4-inch petri dish with a moist filter paper on the bottom. Ten adult Lygus bugs are aspirated from the stock culture and placed in the petri dish. The dishes are covered and held at 80°F. and 60% r.h. After 2 days, mortality counts are made.

M. Boll Weevil — *Anthonomus grandis* Boheman

Test compounds are prepared as 1000 ppm solutions in 10 percent acetone, 0.2 percent Alrodyne 315, and 89.8 percent water. A 10-fold dilution is made with 65 percent acetone and 35 percent water. The first or second true leaf of young cotton plants is dipped for 3–5 seconds in the test solution and placed in an exhaust hood to dry. When dry, each leaf is placed in a 4-inch petri dish with a moist filter paper on the bottom. Ten adult boll weevils are removed from the stock culture and placed in the petri dish. The dishes are covered and held at 80°F. and 60% r.h. After 2 days, mortality counts are made.

N. Tobacco Budworm — *Heliothis virescens* (Fabricius)

Test compounds are prepared as 0.1 percent solutions in 65 percent acetone and 35 percent water. Primary leaves, only one-fourth fully developed, are dipped for 3–5 seconds in the test solution and placed in an exhaust hood to dry. When dry, each leaf is placed in a one-ounce plastic medicine cup containing one dental wick saturated with water and two-third instar tobacco budworms. The cup is capped and held at 80°F. and 60% r.h. After 2 days, mortality counts are made.

O. Lone Star tick — *Amblyomma americanum*

Unfed nymphs of the species *Amblyomma americanum* (lone star tick) are sprayed for 30 seconds with an acetone/water solution containing 1.0 ppm of the test compound. Each test group contained about 10 or more nymphs of a single species and all tests were replicated. The results are reported as a percentage of the group killed.

TABLE II.—MAMMALIAN TOXICITY AND INSECTICIDAL AND ACARICIDAL ACTIVITY EXPRESSED AS PERCENT MORTALITY OF THE INVENTIVE COMPOUNDS

| Compound of example number | S.A.W., percent | | Aphids, percent | | | | | Mites, percent | | | | | TC² 1% | MB³ 1% | GC⁴ 1% | Systemic mites, 100 p.p.m. | Mosquito Larvae | | | Adults, 10 p.p.m. | Fly, 50 p.p.m. | Rootworm | | | Wireworm, lb./acre | | Lygus, 100 p.p.m. | Boll weevil, 100 p.p.m. | Budworm, .1% | Ticks, 1 p.p.m. | Mice, oral LD₅₀ (mg./kg.) |
|---|---|---|---|---|---|---|---|---|---|---|---|---|---|---|---|---|---|---|---|---|---|---|---|---|---|---|---|---|---|---|---|
| | .1 | .01 | .1 | .01 | .001 | .0001 | | .1 | .01 | .001 | .0001 | | | | | | .4 | .1 | .01 | | | 50 | 10 | 1 | 50 | 10 | | | | | |
| 1 (trans) | 100 | 100 | 100 | 100 | 100 | 100 | | 100 | 100 | 100 | 90 | | 100 | 100 | 100 | 100 | 100 | 100 | 100 | 100 | 100 | 100 | 100 | 100 | 100 | 100 | 100 | 80 | 60 | 100 | 22 |
| 1 (cis) | 100 | 90 | 100 | 100 | 100 | 60 | | 100 | 100 | 100 | 0 | | 100 | 100 | 100 | 0 | 100 | 100 | 28 | 100 | 100 | 100 | 100 | 20 | 100 | 100 | 60 | 20 | 0 | 100 | |
| 3 (trans) | 100 | 0 | 100 | 100 | 100 | 30 | | 100 | 100 | 100 | 90 | | 100 | 100 | 93 | 100 | 100 | 100 | 92 | 100 | 100 | 100 | 100 | 100 | 100 | 100 | 100 | 100 | 100 | 10 | 19.5 |
| 4 (cis) | 100 | 0 | 100 | 100 | 100 | 30 | | 100 | 100 | 100 | 0 | | 100 | 100 | 100 | 80 | 100 | 100 | 92 | 100 | 100 | 100 | 100 | 100 | 100 | 100 | 100 | 70 | 0 | 10 | |
| 5 (trans) | 100 | 100 | 100 | 100 | 100 | 15 | | 100 | 100 | 100 | 87 | | 100 | 75 | 100 | 100 | 100 | 100 | 72 | 100 | 100 | 100 | 100 | 70 | 100 | 100 | 100 | 100 | 70 | 100 | 11.3 |
| 6 (cis) | 100 | 10 | 100 | 100 | 100 | 0 | | 100 | 100 | 100 | 0 | | 100 | 40 | 100 | 80 | 100 | 100 | 88 | 100 | 52 | 100 | 100 | 30 | 100 | 100 | 80 | 90 | 20 | 80 | |
| 7 (trans) | 100 | 0 | 100 | 100 | 100 | 0 | | 100 | 100 | 69 | 0 | | | 90 | 50 | 90 | 100 | 88 | 0 | 20 | 100 | 100 | 100 | 40 | 100 | 90 | 0 | 0 | 20 | 100 | |
| 8 (cis) | 100 | 60 | 100 | 100 | 100 | 0 | | 100 | 100 | 76 | 0 | | 100 | 85 | 0 | 98 | 100 | 100 | 12 | 60 | 52 | 100 | 100 | 55 | 100 | 100 | 0 | 0 | 0 | 100 | |
| 9 (trans) | 100 | 80 | 100 | 100 | 100 | 50 | | 100 | 100 | 82 | 0 | | 100 | 90 | 100 | 0 | 100 | 100 | 40 | 100 | 96 | 100 | 100 | 0 | 100 | 100 | 30 | 0 | 50 | 100 | 39 |
| 10 (cis) | 100 | 70 | 100 | 100 | 35 | 0 | | 100 | 100 | 100 | 50 | | 100 | 85 | 0 | 50 | 100 | 100 | 0 | 70 | 100 | 100 | 50 | 0 | 100 | 90 | 50 | 0 | 50 | 100 | |
| 11 (trans) | 100 | 80 | 100 | 100 | 100 | 20 | | 100 | 100 | 76 | 62 | | 100 | 85 | 0 | 100 | 100 | 100 | 48 | 100 | 100 | 100 | 100 | 35 | 100 | 90 | 50 | 50 | 100 | 100 | 34 |
| 12 (cis) | 100 | 0 | 100 | 100 | 100 | 0 | | 100 | 100 | 100 | 0 | | | 100 | 10 | 0 | 100 | 100 | 0 | 0 | 88 | 100 | 80 | 0 | 100 | 100 | 0 | 0 | 0 | 100 | |
| 13 (trans) | 100 | 100 | 100 | 100 | 100 | 95 | | 100 | 100 | 100 | 98 | | 100 | 100 | 100 | 100 | 100 | 100 | 100 | 100 | 100 | 100 | 100 | 100 | 100 | 100 | 100 | 90 | 100 | 100 | 50 |
| 14 (cis) | 100 | 30 | 100 | 100 | 90 | 0 | | 100 | 100 | 60 | 0 | | 100 | 100 | 100 | 74 | 100 | 100 | 32 | 30 | 100 | 100 | 65 | 65 | 100 | 100 | 30 | 50 | 30 | 100 | |
| 15 (trans) | 100 | 0 | 100 | 100 | 90 | 0 | | 100 | 100 | 100 | 50 | | 100 | 45 | 100 | 50 | 100 | 100 | 32 | 30 | 96 | 100 | 65 | 0 | 100 | 100 | 0 | 0 | 0 | 100 | 88 |
| 16 (cis) | 100 | 0 | 100 | 100 | 100 | 0 | | 100 | 100 | 100 | 0 | | 100 | 10 | 30 | 50 | 100 | 100 | 12 | 40 | 100 | 100 | 65 | 0 | 100 | 100 | 0 | 0 | 50 | 100 | |
| 17 (trans) | 100 | 10 | 100 | 100 | 100 | 95 | | 100 | 100 | 100 | 100 | | 100 | 100 | 70 | 100 | 100 | 100 | 100 | 100 | 100 | 100 | 100 | 40 | 100 | 100 | 40 | 100 | 70 | 100 | 102 |
| 18 (cis) | 100 | 10 | 100 | 100 | 100 | 0 | | 100 | 100 | 100 | 35 | | 100 | 90 | 45 | 80 | 100 | 100 | 88 | 0 | 100 | 100 | 100 | 40 | 100 | 100 | 30 | 90 | 0 | 50 | |
| 21 (trans) | 100 | 40 | 100 | 100 | 100 | 100 | | 100 | 100 | 100 | 100 | | 100 | 100 | 85 | 92 | 100 | 100 | 100 | 100 | 100 | 100 | 100 | 0 | 100 | 100 | 100 | 40 | 40 | | |
| 22 (50% trans / 50% cis) | 100 | 70 | 100 | 100 | 100 | 0 | | 100 | 100 | 100 | 0 | | 40 | 10 | 95 | 17 | 100 | 100 | 0 | 20 | 100 | 100 | 100 | 0 | 100 | 0 | 100 | 30 | 70 | 70 | |
| 23 (70% trans / 30% cis) | 100 | 100 | 100 | 100 | 100 | 0 | | 100 | 100 | 100 | 91 | | 98 | 20 | 95 | 100 | 100 | 100 | 92 | 80 | 100 | 100 | 100 | 55 | 100 | 100 | 30 | 100 | 90 | 100 | 44 |
| 24 (75% trans / 25% cis) | 100 | 100 | 100 | 100 | 100 | 0 | | 100 | 100 | 100 | 100 | | 100 | 100 | 95 | 100 | 100 | 100 | 100 | 100 | 100 | 100 | 100 | 100 | 100 | 100 | 70 | 100 | 100 | 80 | 154 |
| 25 (65% trans / 35% cis) | 100 | 100 | 100 | 100 | 50 | 0 | | 100 | 100 | 100 | 20 | | 94 | 0 | 70 | 67 | 100 | 96 | 0 | 0 | 60 | 100 | 83 | 0 | 70 | 0 | 0 | 0 | 50 | | |
| 26 (cis) | 0 | | 100 | 100 | 0 | 0 | | 100 | 100 | 100 | 0 | | 0 | 0 | 0 | 0 | 100 | 88 | 0 | 0 | 52 | 100 | 35 | 0 | 0 | 0 | 0 | 0 | 0 | | |

S.A.W. = Southern armyworm.
T.C. = Tribolium Confusum (confused flour beetle).
MB = Milkweed bug.
GC = German cockroach.

We claim:
1. Aralkylthiovinyl phosphorothioates of the formula:

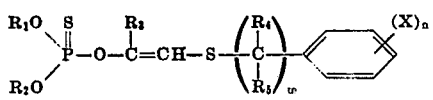

to include either the trans or cis form of said compounds and mixtures of the trans and cis forms wherein:
$R_1$, $R_2$ and $R_3$ are each lower alkyl,
$R_4$ and $R_5$ are selected from the group consisting of lower alkyl or hydrogen,
X is selected from the group consisting of lower alkyl and halo,
$m$ is 1 or 2, and
$n$ is 0 to 3.

2. The compound according to claim 1:

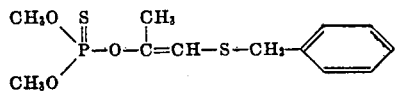

3. The compound according to claim 1:

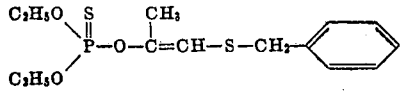

4. The compound according to claim 1:

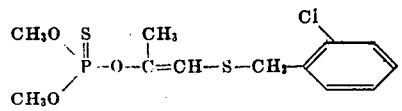

5. The compound according to claim 1:

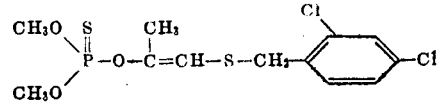

6. The compound according to claim 1:

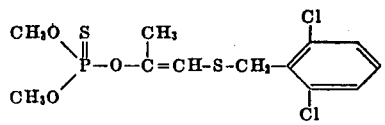

7. Aralkylthiovinyl phosphorothioates of claim 1 of the formula:

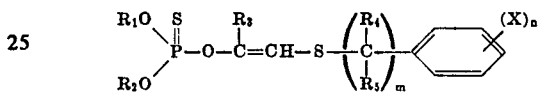

to include either the trans or cis form of said compounds and mixtures of the trans and cis forms wherein:
$R_1$, $R_2$, $R_3$, $R_4$, and $R_5$ are each lower alkyl,
X is selected from the group consisting of lower alkyl and halo,
$m$ is 1 or 2, and
$n$ is 0 to 3.

* * * * *